Patented Apr. 28, 1925.

1,535,213

UNITED STATES PATENT OFFICE.

GUSTAV EGLOFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

PROCESS FOR TREATING ACID-SLUDGE OILS.

No Drawing. Application filed May 16, 1921. Serial No. 470,035.

*To all whom it may concern:*

Be it known that I, GUSTAV EGLOFF, a citizen of the United States, residing in the city of Chicago, county of Cook, and State of Illinois, have invented certain new and useful Improvements in Processes for Treating Acid-Sludge Oils, of which the following is a specification.

This invention relates to improvements in process of treating acid sludge oils, and has as its object to provide a process in which by a vacuum distillation sulphuric acid and other acid constituents, as, for example, sulfonic acid, as well as light or heavy petroleum oils are recovered from the acid sludge.

In petroleum refining, as is well known, such oil constituents as gasoline, kerosene and lubricating oils, are treated with sulphuric acid for the purpose of cleaning and purifying them. In this treatment certain of the oil constituents settle out with the sulphuric acid as acid sludge. By means of the present invention the sulphuric acid is economically recovered and separated from the oily constituents. In addition, certain of the oily constituents, as well as other acids, may be separated and independently collected. There is also recovered sulphur dioxide, which may be treated in the well known manner for conversion into sulphuric acid.

In carrying out this process a still which is maintained under a vacuum is charged with the acid sludge referred to, the contents of the still are then heated up to several hundred degrees, depending upon the character of the acid sludge. As the distillation proceeds, the sulphur dioxide, oily constituents and sulphuric acid come over as condensable or noncondensable gases and are passed to a condenser. More or less sulfonic acid will also pass into the receiver. There will be left in the still a coky-like residue or asphaltic-like material. The various constituents in the receiver will stratify by gravity, while the sulphur dioxide or other gases pass out of the receiver into a suitable gas container or are treated in the usual manner. A vacuum of from say 12 inches to 20 inches may be maintained on the still, or even higher. The temperature may vary from say 250 F. degrees to 750 F. degrees. This process is much more economical than the present process of treating acid sludge.

I claim as my invention:

1. A process of removing from acid sludge oils such constituents as sulphuric acid, other acids and oily substances, consisting in distilling an acid sludge oil under a vacuum of at least 12 inches and in separately collecting such constituents.

2. A process of removing from acid sludge oils such constituents as sulphuric and other acids or oily substances, consisting in distilling an acid sludge oil under a vacuum of at least 12 inches, in removing sulphur dioxide formed during such distillation and in separately collecting such constituents and said sulphur dioxide.

3. A process of removing from acid sludge oil such constituents as sulphuric acid, other acids and oily substances consisting in distilling the acid sludge oil under a vacuum of at least 12 inches and in maintaining the acid at a temperature above 250 degrees F. and in separately collecting the constituents.

4. A process of removing from acid sludge oils such constituents as sulphuric acid other acids and oily substances, consisting in distilling an acid sludge oil under a vacuum of at least 12 inches while maintained at a temperature in excess of 250 degrees F., in removing the sulphur dioxide formed during such distillation and in separately collecting such constituents and sulphur dioxide.

GUSTAV EGLOFF.